March 17, 1931. H. SCHLAICH 1,797,158

MOUNTING FOR TEMPERATURE RESPONSIVE ELEMENTS

Filed July 15, 1921

INVENTOR
HERMAN SCHLAICH
BY
*Moses, Hammond, Morse & Nolte*
ATTORNEYS

Patented Mar. 17, 1931

1,797,158

UNITED STATES PATENT OFFICE

HERMAN SCHLAICH, OF LONG ISLAND CITY, NEW YORK

MOUNTING FOR TEMPERATURE-RESPONSIVE ELEMENTS

Application filed July 15, 1921. Serial No. 484,907.

This invention relates to means for mounting and supporting temperature responsive elements of indicating instruments and the like upon internal combustion engines of automobiles or other vehicles, or in other similar locations, and its object is to protect such element and its connections from injury due to vibration and such strains and stresses as may be created during the operation of the vehicle.

In mounting certain types of temperature indicating instruments the temperature responsive element thereof is associated with the cooling system or other part of engine, while the indicating portion of the instrument is mounted at a point remote therefrom, usually upon the dash of the automobile, in sight of the driver, a slender flexible tube connecting the temperature responsive element and the indicating means and filled with a liquid or gas, being employed for imparting movement to the latter. The temperature responsive element of this type of instrument when so mounted is subjected to certain stresses and strains produced by the running of the vehicle, and these stresses and strains are accentuated when traversing rough roads.

As is well known, considerable vibration is created during the operation of a motor car and in certain car constructions where the frames are long and light in construction, they possess considerable "whip" which creates a difference in vibratory moment between the engine mounting where the bulb of the temperature instrument is mounted and the body where the indicating part of the instrument is mounted. The transmission of the stresses and strains alluded to in practice, have caused serious injury to instruments in which the temperature responsive elements have been rigidly supported, so that after a time the shocks and strains imparted to the element have caused a breakage of the transmission tube where it joins the bulb, thus rendering the instrument useless.

My invention overcomes this serious objection by providing a yielding mounting for the temperature responsive element or bulb and the tube extending therefrom, where they are supported within the housing in association with the engine cylinder, such yieldable mounting acting to absorb and prevent the transmission of strains or stresses to the element and tubing.

The present invention may be considered as in the nature of an improvement on the invention described and claimed in my copending application, Serial No. 439,546, filed January 24, 1921, which is a division of the application which resulted in my Patent No. 1,366,894 dated January 25, 1921.

In order to explain the nature of my invention and the manner in which the above and other objects are secured, I have shown a certain preferred embodiment of my invention, as illustrative of the principle thereof and the best mode now known to me for practicing the same.

In the accompanying drawings, which form a part of this specification,

Figure 1:
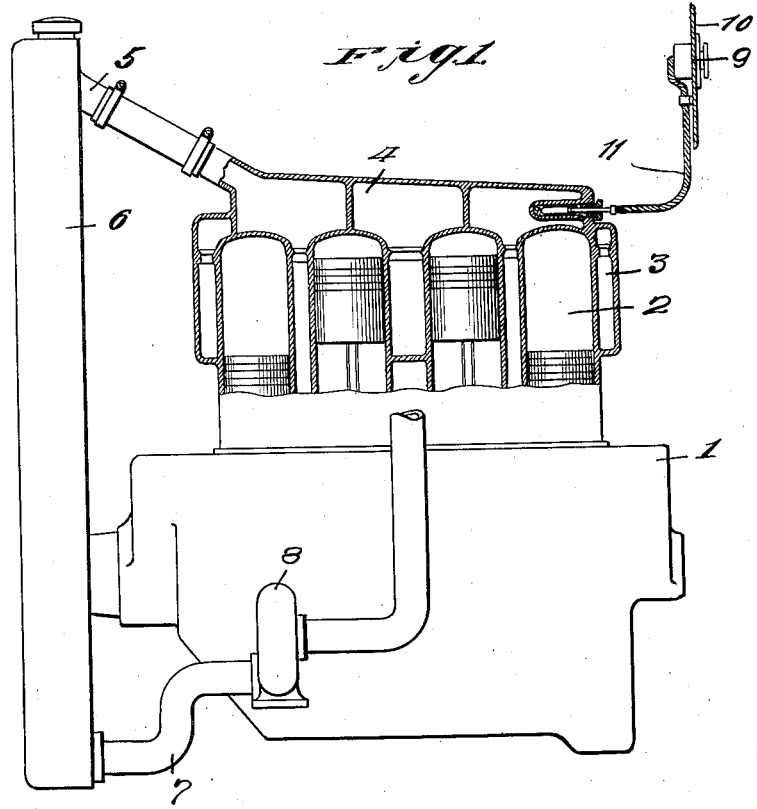
Figure 1 is a diagrammatic side elevation, partly in section, showing an automobile engine, and its cooling system, and a fragmentary portion of the dash of the automobile upon which the indicating portion of the instrument is mounted.
Figure 2:
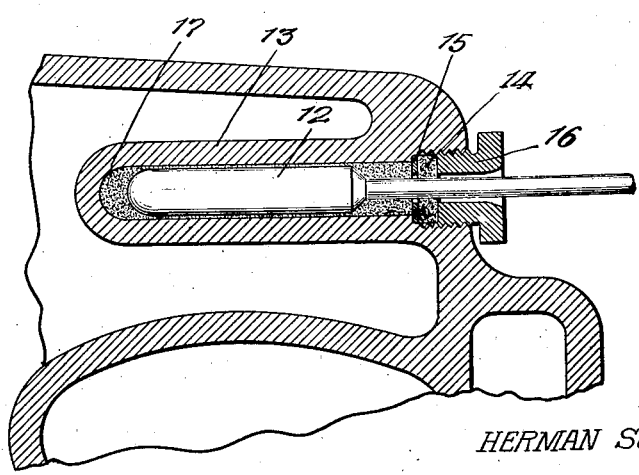
Figure 2 is an enlarged fragmentary detail, partly in section showing a preferred construction embodying the invention.

Referring to the drawings in detail, the internal combustion engine is indicated by the numeral 1, having cylinders 2, the upper parts of which are enclosed by water jackets 3, which communicate through the return manifold 4 and the return pipe 5 with the radiator 6. The lower part of the radiator is connected by the inlet pipe 7 with the jacket space. A circulation may be produced in the cooling system by means of the pump 8 or in any other suitable or well known manner. The water being heated by contact with the engine cylinders in which combustion takes place, passes to the upper part of the radiator, descends through the radiator, and is cooled during such descent, and the cooled water is then carried again into the water jackets through the connections described, where it again performs its cooling function.

In order that the temperature condition of the water circulating through the cooling system and indirectly the temperature condition under which the engine may be operating may be made known to the operator of the automobile or other vehicle, a temperature indicating instrument is employed, and in the present instance, I have illustrated such an instrument comprising a gage 9, of suitable construction mounted on the vehicle dash 10 in position to be observed by the driver at all times, and connected by means of a small tube 11 with a temperature responsive element in the form of a bulb containing an expansible fluid. This bulb in the preferred embodiment of my invention being indicated by the numeral 12 is introduced or received in a tubular depression or pocket 13, which is preferably cast integral with the casting forming the wall of the return manifold 4. The bulb is held in position therein by means of a felt washer 14 or other suitable yieldable member, snugly fitting around a portion of the tube 11 adjacent to the bulb, this felt washer being compressed between a metallic washer 15 and an apertured nut 16 in screw threaded engagement with the mouth of the pocket. Since this washer 14 is, as stated, yieldable in character, it is obvious that the bulb 12 is held in position within the depression in such a manner as to prevent it from being subjected to vibration and such other strains and stresses as might be transmitted to the engine casting in which it may be mounted. As the temperature responsive element is spaced from the walls of the housing as shown, it is highly desirable to communicate the temperature of the water to the expansible fluid within the bulb as directly and accurately as possible, and I have found that by filling the space surrounding the bulb with a filling 17 of graphite and oil, or the like, the transmission of actual thermal conditions of the engine is facilitated. This in no way militates against the yieldable character of the mounting, inasmuch as such filling also possesses the characteristic of yieldability and serves, as it were, as a further cushioning medium and protective agency for the bulb. The yieldable washer member 14 fitting closely the tube 11 serves the further purpose of preventing the filling 17 from leaking or escaping from the pocket.

Owing to the vibration and movement of the body of the vehicle with respect to the engine and the vibration of the engine when running, there is a tendency for the small tube to flex and twist, and if the bulb is rigidly mounted upon the engine, the effect of this flexure and twisting is largely localized in the tube at or adjacent the point where it joins the bulb. This tends to break the tube at this point. When the bulb is mounted in the manner described, however, it is enabled to turn or move end-wise slightly with the tubing so as to relieve the latter from strain, thereby avoiding the breakage referred to. Owing to the bulb being mounted in a pocket formed in the engine structure instead of in a hole opening directly into the water circulating system, there is no danger of leakage of the circulating fluid and the yielding packing means for supporting the bulb need not be such as to constitute a fluid-tight connection.

While I have illustrated and described in detail a preferred form of my invention, it is to be understood that changes may be made therein and the invention embodied in other structures. I do not, therefore, desire to limit myself to the specific construction illustrated, but intend to cover my invention broadly in whatever form its principle may be utilized.

Having thus described my invention what I claim is:

1. In a motor vehicle including an internal combustion engine having an associated part provided with a pocket having a wall of heat conducting material adapted to be contacted by the water in said associated part, and a temperature indicating instrument having a gauge located away from said engine, in combination a bulb located in said pocket and a tube connecting said bulb and gauge, and protective, shock absorbing means retaining said bulb in said pocket and engaging said tube adjacent said bulb, but not with a sufficient force to bind the tube against longitudinal or rotative movement.

2. In a motor vehicle including an internal combustion engine having a cylinder casting provided with a pocket having a wall of heat conducting material adapted to be contacted by the water in the engine water jacket, and a temperature indicating instrument having a gauge located away from said engine, in combination a temperature responsive element located in said pocket and a tube connecting said temperature responsive element and gauge, yielding material surrounding said element and tube within said pocket, and means for retaining said yielding material and said temperature responsive element within said pocket, but not binding the temperature responsive element against rotative movement.

3. In a motor vehicle including an internal combustion engine having a cylinder casting provided with a pocket having a wall of heat conducting material adapted to be contacted by the water in the engine water jacket, and a temperature indicating instrument having a gauge located away from said engine, in combination a bulb located in said pocket and a tube connecting said bulb and gauge, yielding material surrounding said bulb within said pocket, a washer of protective shock absorbing material surrounding said tube near the mouth of said pocket, and means for retaining said washer in position, whereby said bulb and tube are yieldingly held within said pocket.

4. In a motor vehicle, a mounting for a temperature responsive bulb and the connected tube of a distant type temperature responsive instrument, which instrument has the bulb portion thereof carried by the vehicle motor and an indicator portion carried by the body part of the vehicle, said mounting comprising a housing for the bulb, a removable closure at the open end of said housing, and a protective, shock absorbing washer member adjacent the removable closure member and held in place and put under compression thereby, said yielding washer member frictionally engaging and supporting the tube adjacent said temperature responsive bulb within said housing, with capacity for sliding and rotative movement of the bulb relative to the washer.

5. In a mounting for a temperature responsive element of a temperature indicating instrument, the combination of a receptacle therefor, an apertured cover member forming a closure for said receptacle, said apertured cover member accommodating the stem of said element, a resilient washer surrounding said stem and engaging said cover member, a metal washer engaging and constituting a seat for said resilient washer, and a filler including graphite, and oil occupying the space between the element and the receptacle.

6. In a motor propelled vehicle including an engine having a pocket extending into the space confined by the engine water jacket and means for indicating engine temperature, comprising indicator means carried by the body of the vehicle in combination, a temperature responsive element horizontally disposed in the pocket of the engine, and shock absorbing means in the pocket rotatably supporting and protecting the element against injury.

7. In a motor vehicle including an internal combustion engine having a water circulating cooling system and an indicating mechanism to the rear thereof and remote therefrom, in combination, a pocket in the cooling system that includes a wall of heat conducting material arranged to be heated from the water in said cooling system, a temperature responsive element, tubing connecting said element with the remote indicating mechanism, means in the tubing to operate the latter from the former, said element disposed horizontally in the pocket and having a stem projecting toward the rear of the vehicle from the pocket, and protective, shock absorbing means at the rear end of the element supporting the element in the pocket.

8. In a motor vehicle including an internal combustion engine having a water circulating cooling system and an indicating mechanism to the rear thereof and remote therefrom, in combination, a pocket in the cooling system that includes a wall of heat conducting material arranged to be heated from the water in said cooling system, a temperature responsive element, flexible tubing connecting said element with the remote indicating mechanism, means in the tubing to operate the latter from the former, said element disposed horizontally in the pocket and having a stem projecting from the pocket toward the gauge, protective, shock absorbing means at one end of the element, supporting the element substantially horizontally through its stem, and means disposed in the pocket between the element and the pocket wall and completely surrounding the element for transmitting the engine heat to the element and protecting the element against shocks.

In testimony whereof I have affixed my signature to this specification.

HERMAN SCHLAICH.